United States Patent
Markert et al.

(10) Patent No.: US 9,709,967 B2
(45) Date of Patent: Jul. 18, 2017

(54) METHOD AND DEVICE FOR CREATING A DATA-BASED FUNCTION MODEL

(71) Applicant: Robert Bosch GmbH, Stuttgart (DE)

(72) Inventors: Heiner Markert, Stuttgart (DE); Rene Diener, Ludwigsburg (DE); Felix Streichert, Edakita (JP); Andre Guntoro, Pforzheim (DE); Michael Hanselmann, Korntal (DE)

(73) Assignee: Robert Bosch GmbH, Stuttgart (DE)

( * ) Notice: Subject to any disclaimer, the term of this patent is extended or adjusted under 35 U.S.C. 154(b) by 491 days.

(21) Appl. No.: 14/247,104

(22) Filed: Apr. 7, 2014

(65) Prior Publication Data

US 2014/0309754 A1 Oct. 16, 2014

(30) Foreign Application Priority Data

Apr. 10, 2013 (DE) .................. 10 2013 206 292

(51) Int. Cl.
*G05B 13/04* (2006.01)
*G06N 99/00* (2010.01)

(52) U.S. Cl.
CPC .......... *G05B 13/04* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 8,832,006 B2* | 9/2014 | Morinaga | G06N 99/005 706/12 |
| 8,924,453 B2* | 12/2014 | Fastow | G06F 17/10 708/490 |
| 2013/0158996 A1* | 6/2013 | Fastow | G06F 17/10 704/240 |

FOREIGN PATENT DOCUMENTS

| | | |
|---|---|---|
| DE | 10 2010 028 259 | 10/2011 |
| DE | 10 2010 028 266 | 10/2011 |

OTHER PUBLICATIONS

C. Plagemann, K. Kersting, W. Burgard, "Nonstationary Gaussian Process Regression Using Point Estimates of Local Smoothness," ICML Proceedings, pp. 204-2116, 2006.

* cited by examiner

*Primary Examiner* — Van Nguyen
(74) *Attorney, Agent, or Firm* — Norton Rose Fulbright US LLP; Gerard Messina

(57) ABSTRACT

A method for generating a data-based function model includes: providing a first data-based partial model ascertained from a first training data record; providing at least one additional training data record; and performing the following steps for the at least one additional training data record: ascertaining a difference training data record having training data which correspond to the differences between the output values of the relevant additional training data record and the function value of the sum of the partial function values ($f_{first\_partial\_model}(x)$ $f_{second\_partial\_model}(x)$) of the first data-based partial model and previously ascertained data-based partial model(s) at each of the measuring points of the relevant training data record; ascertaining an additional data-based partial model from the difference training data record; and forming a sum (f(x)) from the first and the additional data-based partial models.

7 Claims, 4 Drawing Sheets

METHOD AND DEVICE FOR CREATING A DATA-BASED FUNCTION MODEL

BACKGROUND OF THE INVENTION

1. Field of the Invention

The present invention relates to control units for engine systems, in particular control units having a separate arithmetic unit for evaluating data-based function models, for example, Gaussian process models.

2. Description of the Related Art

Up to now, function models in control units, i.e., the control path and system models, have been implemented through the specification of characteristic maps, characteristic curves, or functions emulating a physical system. These models are adapted by a user by adjusting model parameters to the conditions of the physical system.

The use of non-parametric data-based function models constitutes an alternative, with which the functions of physical systems may be essentially emulated without parameter specifications. For example, a Gaussian process model, which is essentially defined using hyperparameters and nodes, may be used as a data-based function model. The data-based function models are created based on training data which may be ascertained in a testing system. The nodes for the Gaussian process model may correspond to the training data, may be selected from these data, or may be generated from the training data.

In particular, local effects may not be properly mapped by the created data-based function model under certain circumstances. If a data-based function model has already been determined based on training data of an initial training data record, it is difficult to take into consideration training data of a subsequently ascertained training data record in a proper manner in the data-based function model which has already been created. However, simply merging the training data records with or without variation of the hyperparameters of the data-based model allows local effects to be properly taken into consideration only if the training data of the subsequently added training data record have a sufficient number of measuring points. Thus, the additional measuring points may have a sufficient weight in relation to the measuring points of the training data of the initial training data record. Furthermore, it is required that the measuring points of the subsequently added training data record do not conflict with already existing measuring points of the initial training data record, i.e., have a relatively large deviation from them. Otherwise, data-based function models are obtained having high measurement noise and an accordingly high modeling error for the function values in the range of the local effect.

Control units having a microcontroller and a separate model calculation unit for calculating data-based models in a control unit are known from the related art. Thus, for example, a control unit having an additional logic circuit is known from Published German patent application document DE 10 2010 028 259 A1, which is designed for calculating exponential functions in order to support the execution of Bayesian regression methods, which are required in particular for the calculation of Gaussian process models.

Furthermore, an additional method for adding measuring points of an additional training data record to an existing Gaussian process model is known from C. Plagemann, K. Kersting, W. Burgard, "Nonstationary Gaussian Process Regression Using Point Estimates of Local Smoothness," ICML Proceedings, pp. 204-2116, 2006. However, this method is inefficient, in particular since the parameter optimization is difficult.

BRIEF SUMMARY OF THE INVENTION

According to a first aspect of the present invention, a method for creating a data-based function model is provided. The method includes the following steps:
providing or creating a first data-based partial model ascertained from a first training data record; and
providing one or multiple additional training data records;
the following additional steps being carried out for each of the provided additional training data records:
ascertaining a difference training data record having training data which correspond to the differences between the output values of the relevant additional training data record and the function value of the sum of the partial function values of the first data-based partial model and the previously ascertained one or multiple additional data-based partial models at each of the measuring points of the relevant additional training data record;
ascertaining an additional data-based partial model from the difference training data record; and
forming a sum from the first data-based partial model and the ascertained additional data-based partial models.

One idea of the aforementioned method for creating a data-based function model is to additively interconnect multiple data-based partial models in order to implement a control path or system model in a control unit. This enables a proper representation of local effects, which are modeled as a separate data-based partial model. The aforementioned method provides for forming an additive chain of a number of data-based partial models in which, based on a first data-based partial model, each additional data-based partial model specifies an additive deviation from the first data-based partial model or the sum of the first data-based partial model and the additional data-based partial models already taken into consideration. In this way, local effects may be well modeled, in particular based on the breadth of the data-based model determined by the hyperparameters, without substantially impairing the first data-based partial model.

The additive merging of multiple data-based partial models has the additional advantage that they may be calculated in a simple manner in a control unit using an additional model calculation unit.

By providing the model calculation unit, which calculates multiple data-based partial models in succession in an independent manner and adds up the resulting partial results, a simple ascertainment of a function value based on the aforementioned additive function model is made possible. By avoiding the arithmetic unit having to prepare the model calculation unit for the calculation of each individual partial model, the calculation of a corresponding function value may be considerably accelerated.

Furthermore, it may be provided that each of the additional training data records contains training data which are associated with a local effect using a classification or clustering method.

In particular, the additional data-based partial model may be ascertained from the difference training data record in such a way that it drops to a constant value of zero in the extrapolation range.

Furthermore, the data-based partial models may correspond to Gaussian process models, the one or the multiple additional data-based partial models being ascertained from the corresponding difference training data record based on an average value function which is constantly zero.

According to one additional aspect, a method for calculating a function value of a data-based function model is provided in a control unit which has an arithmetic unit and a separate model calculation unit, the data-based function model having multiple partial models. The method includes the following steps:

provide input data to the model calculation unit;
transmitting a calculation address, which specifies an address of first configuration data in a memory unit, to a DMA unit;
retrieving the first configuration data, which contain parameters and node data for calculating a first partial model, from the memory unit, and transmitting the first configuration data to the model calculation unit;
ascertaining a first partial function value of the first partial model based on the input data; and
storing the first partial function value in an accumulator in the model calculation unit;
the following steps being carried out repeatedly until a stop condition exists:
retrieving additional configuration data, which contain parameters and training data for calculating an additional partial model, from the memory unit, and transmitting the relevant additional configuration data to the model calculation unit;
ascertaining an additional partial function value of the additional partial model based on the input data; and
adding the additional partial function value to the value stored in the accumulator.

The combination of the first-mentioned method for creating a data-based function model in connection with the calculation in a model calculation unit with the aid of a DMA unit enables the execution of a linked calculation method in the model calculation unit, which in turn the calculations to be carried out rapidly without loading the arithmetic unit.

Furthermore, the additional configuration data may be retrieved from a memory area which is a function of the calculation address, in particular by applying a predefined address offset to the calculation address.

According to one specific embodiment, the stop condition may be specified by the retrieved additional configuration data.

It may be provided that the stop condition specifies that the arithmetic unit identifies the value stored in the accumulator as a function value of a data-based function model.

In particular, the retrieval of the additional configuration data from the memory unit, the transmission of the relevant additional configuration data to the model calculation unit, and the starting of the ascertainment of the additional partial function value of the additional partial model may be carried out by the DMA unit.

According to one additional aspect, a device, in particular an arithmetic unit, is provided for creating a data-based function model, the device being designed to:

provide a first data-based partial model ascertained from a first training data record; and
provide one or multiple additional training data records;
the device furthermore being designed to carry out the following steps for each of the provided additional training data records:
ascertaining a modified additional difference training data record having training data as differences between the output values of the relevant additional training data record and the function value of the sum of the partial function values of the first data-based partial model and the previously ascertained additional data-based partial models at each of the measuring points of the relevant additional training data record; and
ascertaining an additional data-based partial model from the modified training data record;
the device furthermore being designed to form a sum from the first data-based partial model and the ascertained additional data-based partial models.

According to one additional aspect, a control unit for calculating a function value of a data-based function model is provided, the data-based function model having multiple partial models, including:

an arithmetic unit for transmitting a calculation address to a DMA unit;
a separate model calculation unit in order to ascertain a partial function value of a provided partial model based on the input data, and to add the partial function value to a value stored in an accumulator of the model calculation unit;
a memory unit for storing first configuration data which contain parameters and training data for calculating a first partial model, and for storing additional configuration data which contain parameters and training data for calculating one or multiple additional partial models; and
the DMA unit, which is designed to retrieve configuration data from the memory unit and to transmit it to the model calculation unit.

According to one additional aspect, a computer program is provided which is configured to carry out all steps of the aforementioned method for creating a data-based function model.

DETAILED DESCRIPTION OF THE INVENTION

Figure 1:
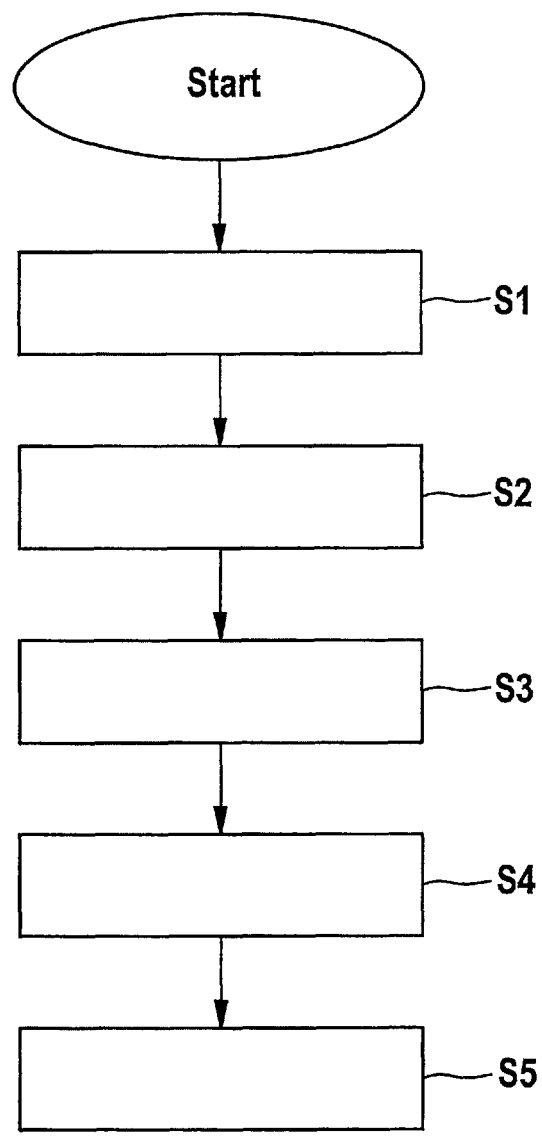
FIG. 1 shows a flow chart for illustrating the method for creating a data-based function model.

A method is initially described based on the flow chart of FIG. 1, according to which a data-based function model, in the illustrated exemplary embodiment a Gaussian process model, is ascertained via additive application of multiple data-based partial models.

In step S1, a first data-based partial model $f_{first\_partial\_model}(x)$ is provided based on hyperparameters and nodes, which is formed completely or partially from a first initially provided training data record.

In step S2, a second training data record $$(x_i, y_i), i=1, \ldots, N$$

is furthermore provided, where $x_i$ represents the p-dimensional measuring points and $y_i$ represents the scalar output values.

In step S3, the deviations $\tilde{y}_i$ between the model predictions $f_{first\_partial\_model}(x_i)$ (output values or function values) of the first data-based partial model and the measuring points $y_i$ at the observed measuring points of the second training data record are then ascertained:)

$$\tilde{y}_i = y_i - f_{first\_partial\_model}(x_i)$$

In step S4, an additional, second data-based model $f_{second\_partial\_model}(x)$ is trained on the obtained deviations) $\tilde{y}_i$, i.e., on the training data $(x_i, \tilde{y}_i)$, i=1, ..., N. It is to be noted that the additional partial model is trained with the aid of an average value function which corresponds to a constant value of 0, thus following the zero function in the extrapolation range.

In step S5, the first, initially provided data-based partial model and the second, additional data-based partial model may be additively connected:

$$f(x) = f_{first\_partial\_model}(x) + f_{second\_partial\_model}(x)$$

where f(x) corresponds to the function value of the overall data-based function model.

This concept may be generalized in a simple manner by allowing any number of additional partial models. For example, measuring points of an additional training data record, which, for example, were associated with a certain local effect via a classification or clustering method, may be modeled in an additional data-based partial model. The additional data-based partial model is created from a difference training data record whose output values correspond to the differences between the output values of the additional training data record to be taken into consideration and the corresponding function values of a data-based model formed from an addition of the previously ascertained data-based partial models at the measuring points of the additional training data record. The additional data-based partial model is then ascertained based on the difference training data record. This approach may be repeated for all additional training data records.

For a quantity I of additional data-based partial models which were ascertained in the above-described manner, the following applies:

$$f(x) = c_0 + a_0 f_{first\_partial_{model}}(x) + \sum_{i=1}^{I} a_i f_{additional\_partial_{model_i}}(x)$$

For each individual result of a partial model, a model-dependent scaling factor $a_n$ (where n=0, ..., I) exists, with which the weight of the relevant partial model $$f_{additional\_partial_{model_n}}$$

may be taken into consideration. In addition, a global model offset also exists, which is defined as $c_0$ and may be configured as a part of hyperparameters. These parameters belong to the model parameters and describe the output normalization of the function model to be ascertained.

Figure 2:
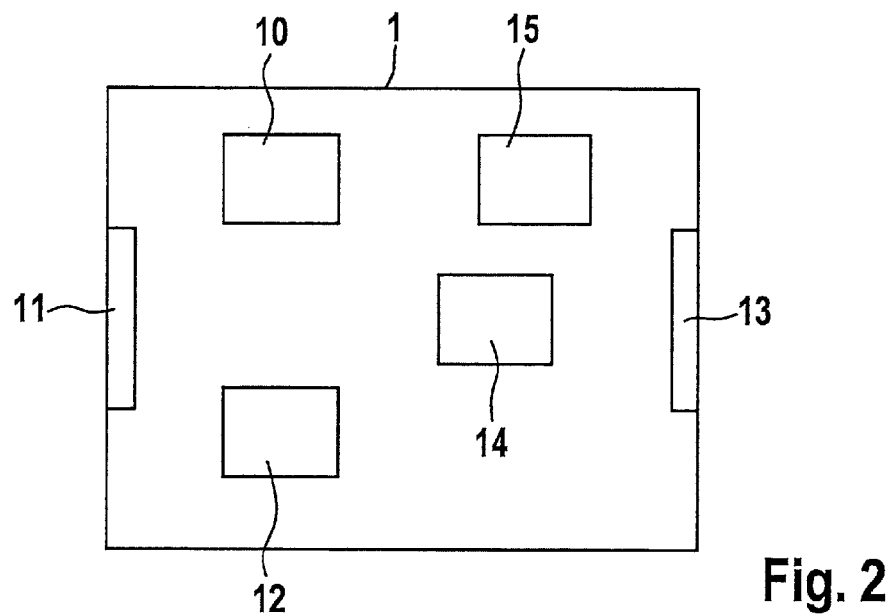
FIG. 2 shows a schematic representation of a control unit having a microcontroller, a model calculation unit, and a DMA unit.

FIG. 2 schematically depicts the structure of a control unit 1, with which the aforementioned additive data-based function model may be calculated in a particularly efficient manner. Control unit 1 is used to operate an engine system in a motor vehicle. Control unit 1 includes an arithmetic unit 10, a memory unit 12, an input interface 11, an output interface 13, a DMA unit 14 (DMA=direct memory access), and a model calculation unit 15.

Control unit 1 receives external input signals, for example, from sensors or other control units such as other modules of engine system 1, via input interface 11. The received signals include input values and may also indicate user specifications in addition to sensor signals.

Control unit 1 is used to carry out the control unit functions in order to calculate one or multiple output values as a function of the input values which are received via input interface 11, and to output them via output interface 13. Control unit 1 must calculate control path and system models for carrying out the functions, and uses a separate model calculation unit 15 for this which is designed for calculating data-based function models. In particular, model calculation unit 15 is specialized in the calculation of exponential functions, which are required for calculating Gaussian process models.

Data are stored in memory unit 12 which were determined for certain output values offline, i.e., in test measurements, and, for example, include hyperparameters of one or multiple data-based function models and nodes (node data), which contain a part of or all training data for the relevant data-based model.

In addition, parameters and variables which were received or calculated by arithmetic unit 10 may also be stored in memory unit 12.

Furthermore, control unit 1 includes DMA unit 14, which makes it possible for model calculation unit 15 to access memory unit 12 directly, in addition to arithmetic unit 10. Furthermore, DMA unit 14 may start a calculation of a data-based model by retrieving corresponding parameters and node data from memory unit 12 and forwarding them to model calculation unit 15.

For calculating data-based models, it may be provided that arithmetic unit 10 transmits the hyperparameters and node data (training data) directly to model calculation unit 15, or communicates, in the form of a pointer, to a memory area of memory unit 12 of model calculation unit 15, from which area of memory unit 12 the hyperparameters required for calculating the data-based model and node data (training data) may be retrieved as configuration data. Model calculation unit 15 may then access memory unit 12 and retrieve the parameters and node data (training data) with the aid of DMA unit 14. Furthermore, DMA unit 14 may be designed to automatically read in a next record of hyperparameters and node data as configuration data into the model calculation unit, after a function value of a data-based partial model has been calculated. The consecutive calculations are terminated if a stop condition is fulfilled.

Figure 3:
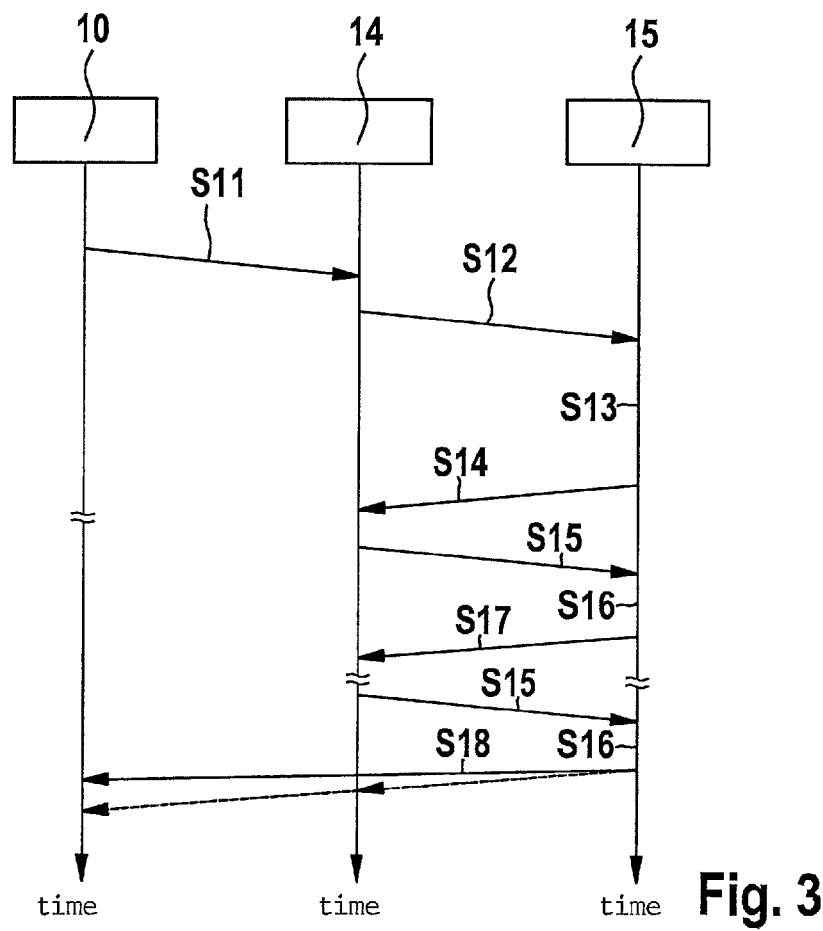
FIG. 3 shows a flow chart for illustrating the method for calculating a function value of a data-based function model which is based on additive data-based partial models.

FIG. 3 shows the flow of the calculation of a previously described partial model from additively applied data-based models. In step S11, arithmetic unit 10 instructs DMA unit 14 to retrieve configuration data KD for calculating the first partial model from memory unit 12. For this purpose, arithmetic unit 10 transmits a calculation data address BA, which represents the start address of a first configuration folder 21, and a start prompt to DMA unit 14, via which the calculation is started in model calculation unit 15.

Figure 4:
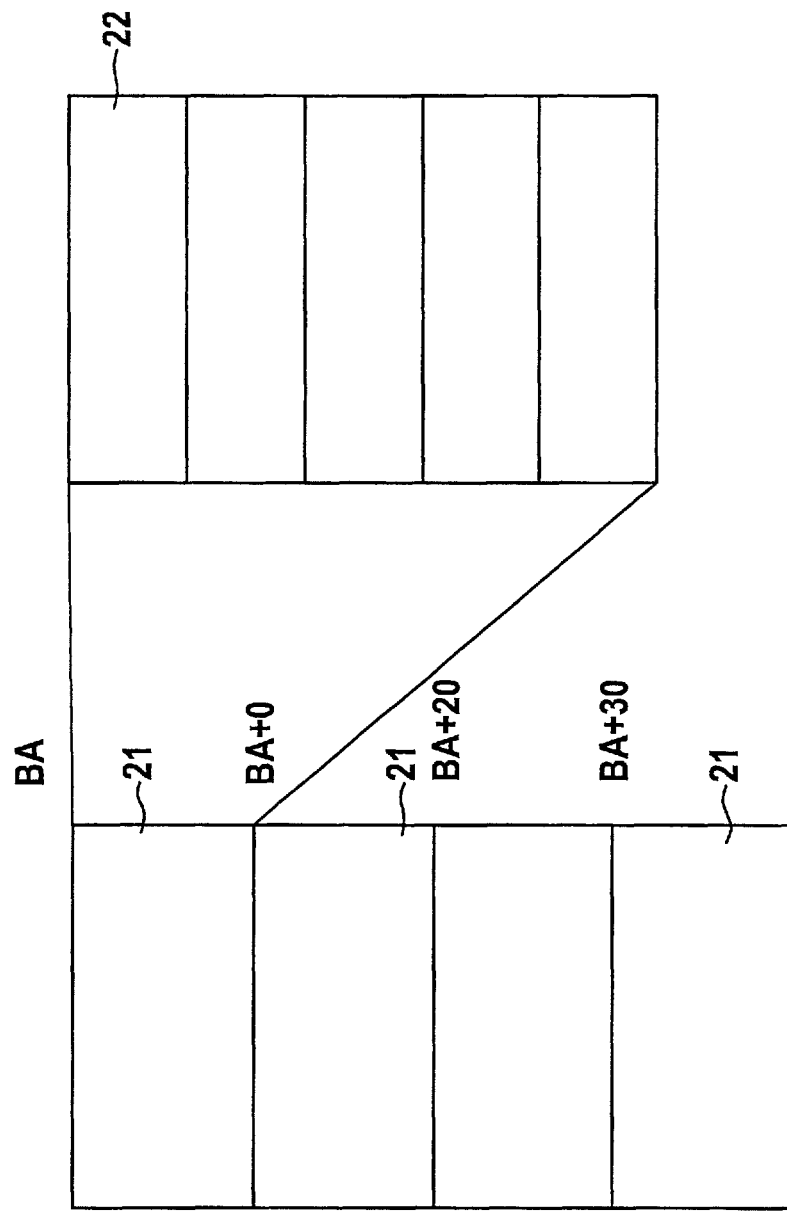
FIG. 4 shows a representation of a memory usage for access with the aid of the DMA unit.

As schematically depicted in FIG. 4, memory unit 12 has multiple memory areas for storing configuration folders 21. Configuration folders 21 each contain configuration registers 22 which contain the hyperparameters and the node data for the data-based partial models to be calculated, which are to be additively connected. Configuration folders 21 are preferably directly attached to each other in the calculation sequence.

First configuration folder 21 represents a memory area in memory unit 12 in which the parameters and node data for the calculation of the first data-based partial model are stored in configuration registers 22.

After the start prompt, DMA unit 14 retrieves the data from first configuration folder 21 in step S11 and transmits these data in step S12 to model calculation unit 15.

After the hyperparameters and node data for the first partial model have been transferred into model calculation unit 15, an accumulator 31 of model calculation unit 15 is reset to the aforementioned model offset value $c_0$, which may be received as a part of the hyperparameters, and in step S13, a first partial function value of the first data-based partial model is calculated, and the first partial function value is added to the value stored in accumulator 31 of model calculation unit 15.

Figure 5:
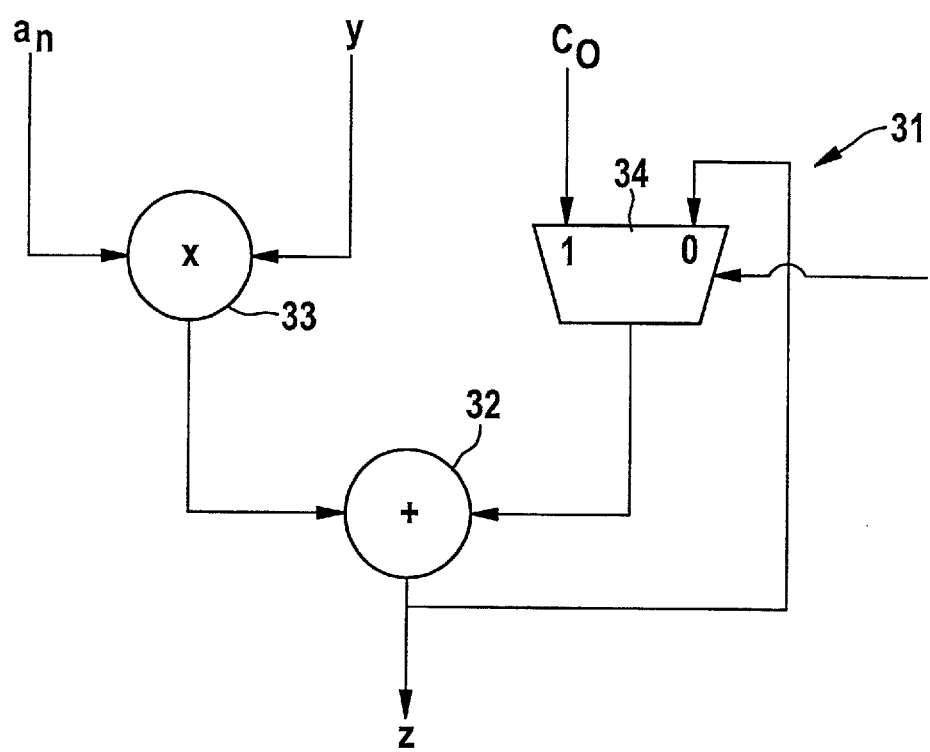
FIG. 5 shows a part of the model calculation unit for additive inclusion of a partial function result of a data-based partial model.

FIG. 5 schematically depicts a circuit for linking the partial function results in accumulator 31 in model calculation unit 15. The accumulator has a summation element 32 and a multiplication element 33. Multiplication element 33 multiplies the obtained partial function result by a corresponding weighting factor $a_n$, which may be predefined as a part of the hyperparameters. The weighted partial function result is now added in summation element 32 to the previously calculated/stored value. A feedback of the output of summation element 32 is implemented at its input with the aid of a demultiplexer 34. The aforementioned initialization may be carried out using the model offset value $c_0$ by correspondingly switching demultiplexer 34 with the aid of a predefined signal "config_set."

In step S14, the completion of the execution of the calculation of the first partial function value is communicated to DMA unit 14.

Thereupon, in step S15, DMA unit 14 requests the parameters and node data for a second partial model of a start address of a second configuration folder 21 from memory unit 14. The start address of second configuration folder 21 is a function of calculation data address BA and is ascertained through addition of a predefined address offset O, which indicates the memory size of configuration folder 21. The parameters and node data for the second partial model are transferred to model calculation unit 15 in order to calculate the second partial model.

The second partial model is calculated in step S16 and the resulting second partial function value is subsequently added to the value stored in the accumulator. If a corresponding parameter has been stored in the relevant configuration folder 21, the second partial function value may be weighted beforehand with the aid of a weighting factor $a_i$, in particular applied multiplicatively.

In step S17, the completion of the execution of the calculation of the second partial function value is communicated to DMA unit 14.

Steps S15 through S17 are now repeated as often as corresponds to the number of configuration folders 21 which are stored in memory unit 12 for the calculation of a corresponding partial function value.

Configuration folder 21, which is used for calculating the last partial result, may be identified accordingly. Alternatively, configuration folder 21 following the last calculation may be correspondingly configured as a stop command. In this way, after the calculation of the nth partial result and the additive application to the value stored in the accumulator, in step S18, a calculation end-interrupt may be transferred directly or indirectly via DMA unit 14 to arithmetic unit 10, so that arithmetic unit 10 retrieves the final result from the accumulator as a function value of the model calculation by the model calculation unit 15.

The last configuration register 22 of each configuration folder 21 may predefine a corresponding configuration for the start of the calculation in model calculation unit 15. In this way, the configuration process of model calculation unit 15 and the start of the calculation process may be managed and initiated via DMA unit 14.

After the calculation of the last partial function value and after the ascertainment of the overall function value in the accumulator, in order for model calculation unit 15 to provide this value for immediate retrieval by arithmetic unit 10, configuration folder 21 of the nth partial model may set an interrupt setting on arithmetic unit 10. Alternatively, the interrupt setting may also be set on DMA unit 14, which in turn forwards the interrupt to arithmetic unit 10.

During the transmission of the parameters and node data to model calculation unit 15, a DMA function "DMA—Repeat—Copy" known per se for DMA units may be used, which may be triggered for the first partial model by arithmetic unit 10 and subsequently by the calculation end-interrupt of model calculation unit 15.

What is claimed is:

1. A method for calculating a function value of a data-based function model in a control unit which has an arithmetic unit and a separate model calculation unit, wherein the data-based function model has multiple partial models, comprising:

providing input data to the model calculation unit;

transmitting a calculation address, which indicates an address of first configuration data in a memory unit, to a direct memory access (DMA) unit;

retrieving the first configuration data, which contain parameters and node data for calculating a first partial model, from the memory unit, and transmitting the first configuration data to the model calculation unit;

ascertaining a first partial function value of the first partial model based on the input data;

storing the first partial function value in the model calculation unit; and repeating the following steps until a predefined stop condition is satisfied:

retrieving additional configuration data, which contain parameters and node data for calculating an additional partial model, from the memory unit, and transmitting the relevant additional configuration data to the model calculation unit;

ascertaining an additional partial function value of the additional partial model based on the input data; and adding the additional partial function value to the value stored in the model calculation unit.

2. The method as recited in claim 1, wherein the additional configuration data are retrieved from a memory area which is determined by applying a predefined address offset to the calculation address.

3. The method as recited in claim 2, wherein the stop condition is specified by the retrieved additional configuration data.

4. The method as recited in claim 3, wherein the stop condition specifies that the arithmetic unit indicates the value stored in the model calculation unit as a function value of a data-based function model.

5. The method as recited in claim 4, wherein the retrieval of the additional configuration data from the memory unit, the transmission of the relevant additional configuration data to the model calculation unit, and the starting of the ascertainment of the additional partial function value of the additional partial model are carried out by the DMA unit.

6. A control unit for calculating a function value of a data-based function model in the form of a Gaussian process model which has multiple partial models, comprising:
- a memory unit to store first configuration data which contain parameters and node data for calculating a first partial model, and additional configuration data which contain parameters and node data for calculating at least one additional partial model;
- a direct memory access (DMA) unit;
- an arithmetic unit to transmit a calculation address, which indicates an address of the first configuration data in the memory unit, to the DMA unit; and
- a separate model calculation unit;
- wherein the DMA unit is configured to:
  - retrieve the first configuration data from the memory unit and transmit the first configuration data to the model calculation unit; and
  - retrieve the additional configuration data from the memory unit and transmit the additional configuration data to the model calculation unit; and
- wherein the model calculation unit is configured to:
  - ascertain a first partial function value of the first partial model based on the input data;
  - store the first partial function value in the model calculation unit;
  - ascertain an additional partial function value of the at least one additional partial model based on the input data; and
  - add the additional partial function value to the value stored in the model calculation unit.

7. A non-transitory, computer-readable data storage medium storing a computer program having program codes which, when executed on a computer, performs a method for calculating a function value of a data-based function model in a control unit which has an arithmetic unit and a separate model calculation unit, wherein the data-based function model has multiple partial models, the method comprising:
- providing input data to the model calculation unit;
- transmitting a calculation address, which indicates an address of first configuration data in a memory unit, to a direct memory access (DMA) unit;
- retrieving the first configuration data, which contain parameters and node data for calculating a first partial model, from the memory unit, and transmitting the first configuration data to the model calculation unit;
- ascertaining a first partial function value of the first partial model based on the input data;
- storing the first partial function value in the model calculation unit; and
- repeating the following steps until a predefined stop condition is satisfied:
  - retrieving additional configuration data, which contain parameters and node data for calculating an additional partial model, from the memory unit, and transmitting the relevant additional configuration data to the model calculation unit;
  - ascertaining an additional partial function value of the additional partial model based on the input data; and
  - adding the additional partial function value to the value stored in the model calculation unit.

* * * * *